United States Patent
Prociw et al.

(10) Patent No.: US 8,181,465 B2
(45) Date of Patent: May 22, 2012

(54) POSITIONING ARRANGEMENT FOR COMPONENTS OF A PRESSURE VESSEL AND METHOD

(75) Inventors: Lev Alexander Prociw, Elmira (CA); Alexsandar Kojovic, Oakville (CA)

(73) Assignee: Pratt & Whitney Canada Corp., Longueuil (CA)

( * ) Notice: Subject to any disclaimer, the term of this patent is extended or adjusted under 35 U.S.C. 154(b) by 453 days.

(21) Appl. No.: 12/262,214

(22) Filed: Oct. 31, 2008

(65) Prior Publication Data

US 2009/0060636 A1 Mar. 5, 2009

Related U.S. Application Data

(62) Division of application No. 11/061,608, filed on Feb. 22, 2005, now abandoned.

(51) Int. Cl.
*F02C 7/20* (2006.01)
(52) U.S. Cl. .......................... 60/796; 60/740
(58) Field of Classification Search .............. 60/740, 60/742, 746–748, 752, 796–798; 16/21
See application file for complete search history.

(56) References Cited

U.S. PATENT DOCUMENTS

| | | | |
|---|---|---|---|
| 2,559,198 A | 7/1951 | Ogden et al. | |
| 3,224,194 A * | 12/1965 | De Feo et al. | 60/793 |
| 4,070,120 A | 1/1978 | Bald et al. | |
| 4,441,323 A * | 4/1984 | Colley | 60/737 |
| 4,565,314 A | 1/1986 | Scholz | |
| 5,088,279 A * | 2/1992 | MacGee | 60/226.1 |
| 5,253,944 A | 10/1993 | Preston | |
| 5,449,272 A * | 9/1995 | Boyd et al. | 415/209.2 |
| 5,678,944 A | 10/1997 | Slocum et al. | |
| 5,769,554 A | 6/1998 | Slocum | |
| 5,964,397 A | 10/1999 | Dautartas | |
| 6,067,792 A * | 5/2000 | Tubbs | 60/806 |
| 6,193,430 B1 | 2/2001 | Culpepper et al. | |
| 6,490,868 B1 * | 12/2002 | Bunce et al. | 60/803 |
| 6,746,172 B2 | 6/2004 | Culpepper | |
| 6,965,166 B2 | 11/2005 | Hikita et al. | |
| 7,625,169 B2 * | 12/2009 | Manzoori | 415/14 |
| 2005/0210864 A1 * | 9/2005 | Lapergue et al. | 60/262 |
| 2005/0286824 A1 * | 12/2005 | Garcia | 384/476 |
| 2007/0137218 A1 * | 6/2007 | Prociw et al. | 60/796 |

* cited by examiner

*Primary Examiner* — Louis Casaregola
*Assistant Examiner* — Phutthiwat Wongwian
(74) *Attorney, Agent, or Firm* — Norton Rose Canada LLP

(57) ABSTRACT

The positioning arrangement comprises at least one pair of complimentary rounded recesses, each recess being provided on the mating face of the corresponding component. One ball is positioned between each pair of complementary recesses.

15 Claims, 3 Drawing Sheets

POSITIONING ARRANGEMENT FOR COMPONENTS OF A PRESSURE VESSEL AND METHOD

CROSS-RELATED APPLICATION

The present application is a divisional of U.S. patent application Ser. No. 11/061,608, filed Feb. 22, 2005 now abandoned, the entire contents of which are hereby incorporated by reference.

TECHNICAL FIELD

The technical field relates generally to a positioning arrangement for components of a pressure vessel and to a method of positioning two adjacent components of a pressure vessel.

BACKGROUND

Pressure vessels are often made of two or more components that are connected together at some point during manufacturing. These components generally have mating faces that are provided with complementary positioning elements to ensure that the components are perfectly aligned. These positioning elements have a number of advantages, including being able to ensure that components are always oriented in accordance with their design. However, pressure vessels, particularly thin wall pressure vessels, are often prone to high stress concentration when provided with these positioning elements.

In some arrangements, the positioning elements include a cylindrical pin located at the interface between the two components being joined together. Cylindrical pins have some limitations and drawbacks. At first, small cylindrical pins are difficult to handle during the assembly and pins manufactured with very small tolerances are expensive. They can also be easily damaged if they are not handled properly. Then, the arrangements require that two perfectly colinear cylindrical holes be provided in the adjacent surfaces. These holes produce stress concentrations due to the relatively deep holes that are required and the sharp edges thereof.

Accordingly, there is a need to provide an improved positioning arrangement for components of a pressure vessel, and a method of assembling two adjacent components of a pressure vessel, with very minimal stress concentrations.

SUMMARY

In one aspect, there is provided a positioning arrangement for a gas turbine engine case having a component to be secured to an inner surface of the case, the arrangement comprising: a gas turbine engine case assembly configured to maintain a volume of fluid inside the case assembly and configured to maintain a pressure difference across a peripheral wall of the case assembly, the wall having an inner surface; at least one pair of complementary recesses provided in mating faces, the recesses forming a rounded space when mated together, one of said recesses provided on one of the mating faces on the component and the other recess provided on the mating face on the inner wall of the case assembly, and one ball matingly positioned within the rounded space of the at least one corresponding pair of complementary recesses when the component is mounted to the case assembly.

In another aspect, there is provided a method of assembling a component to a gas turbine engine case assembly, the method comprising: providing a gas turbine engine case assembly and at least one component to be mounted thereto; providing a first recess in one of the case assembly and the at least one component; providing a second recess in the other of the case assembly and at least one component, the two recesses being complementary and forming a rounded space when the two adjacent components are being assembled; and providing a ball between the two complementary recesses, the ball having an external shape and size which substantially mate with an internal shape and size of the rounded space.

In another aspect, there is provided a pressure vessel connection arrangement comprising: a pressure vessel having a substantially continuous wall provided with a recess configured and disposed to face a complementary recess in a component to which the wall is connected; and one rounded element snugly fitted in a space formed between the complementary recesses.

In another aspect, there is provided a positioning arrangement for a pressure vessel formed between a gas turbine engine case wall and a component to be secured to an inner surface of the gas turbine engine case wall, the positioning arrangement comprising: a first mating face provided on the inner surface of the gas turbine engine case; a second mating face provided on the component; at least one pair of complementary recesses provided on the mating faces, the recesses forming a rounded space when mated together, one of said recesses of each pair provided on the second mating face and the other recess of each pair provided on the first mating face, and one ball matingly positioned within the rounded space of each corresponding pair of complementary recesses when the component is secured to the gas turbine engine case wall.

Further details of these and other aspects will be apparent from the detailed description and figures included below.

BRIEF DESCRIPTION OF THE FIGURES

Reference is now made to the accompanying figures depicting aspects of the improved arrangement, in which.

DETAILED DESCRIPTION

Figure 1:
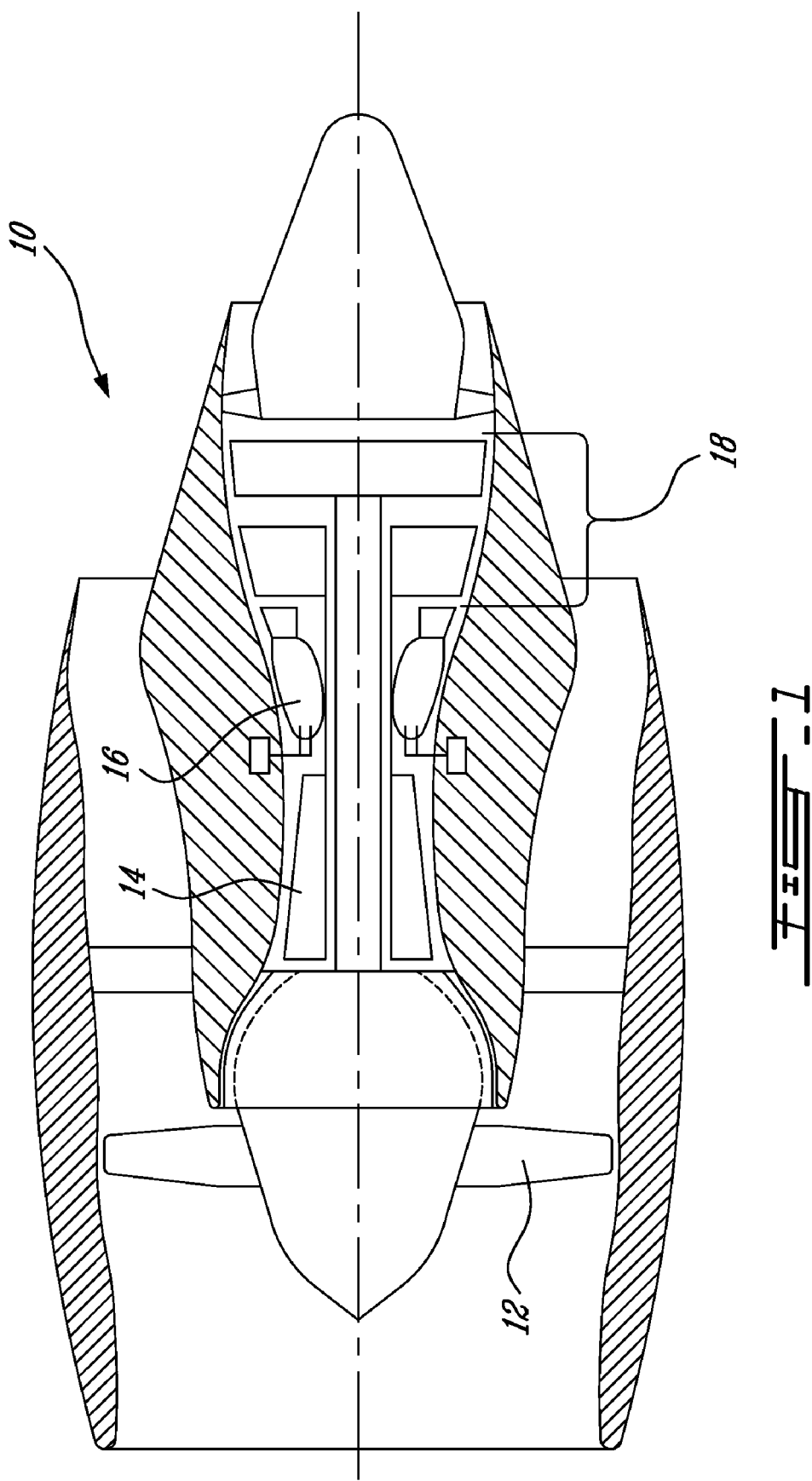
FIG. 1 schematically shows a generic gas turbine engine to illustrate an example of a general environment in which the arrangement can be used.

FIG. 1 illustrates a gas turbine engine 10 of a type provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

A pressure vessel can be generally defined as a hollow structure which will be pressurized at one point during its use. This pressure will generate internal forces in the material of the structure. Very often, a pressure vessel is made of at least two components that are secured together using bolts, welds, solders or any other suitable kind of fasteners. An example of such pressure vessels is the engine casing of the gas turbine engine 10.

Figure 2:
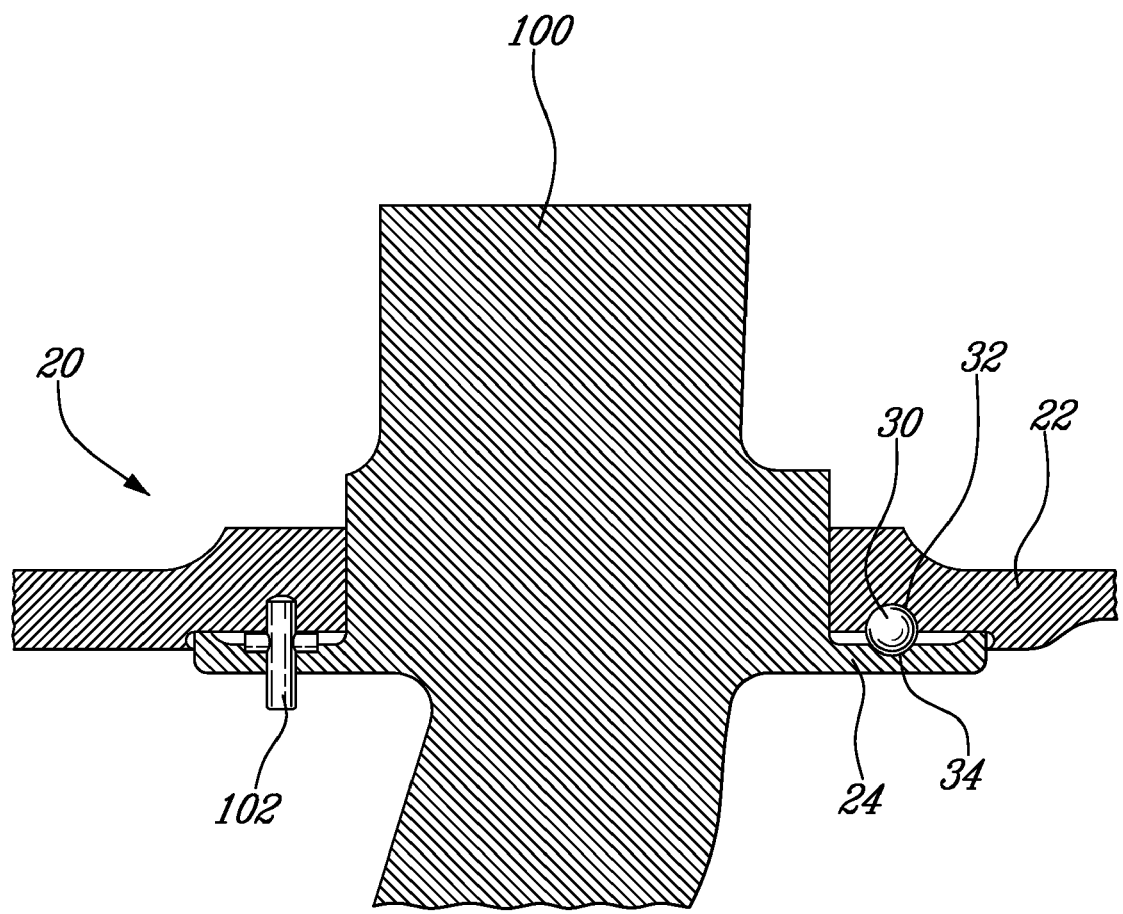
FIG. 2 is a schematic side view showing an example of a pressure vessel with two different positioning arrangements.

FIG. 2 schematically illustrates an example of a pressure vessel 20 having two mating components 22, 24 being secured together using fasteners (not shown). In this case, the pressure vessel 20 comprises the walls of a fuel nozzle 100.

To ensure that the mating components 22, 24 of the pressure vessel 20 are aligned relative to each other with a very high degree of accuracy, one can uses at least one rounded element, such as a spherical ball 30, which is designed to fit between a pair of opposite complementary recesses 32, 34 machined in the mating faces of the components 22, 24, which complementary recesses 32, 34 form together a rounded space in which the ball 30 is set. FIG. 2 also illustrates, on the left side, a pin 102 similar to the ones used in the prior art.

In the illustrated arrangement, the rounded space and the ball 30 are spherical. Moreover, more than one set of spherical balls 30 and corresponding spherical recesses 32, 34 can be provided and their position is such that during assembly, the components 22, 24 cannot be assembled with a wrong orientation. For instance, the position of the various balls 30 can be out of alignment with reference to a line of symmetry of the components 22, 24 for this purpose.

The advantages of using balls 30 and corresponding recesses 32, 34 are numerous. First, the balls 30 are available at low cost with very accurate tolerances. They are available in a large number of sizes. Balls 30 can be easily manipulated with equipment devised for ball tacking and they can be easily positioned during the manufacturing. These balls 30 are more robust than pins, especially during handling or dropping. Moreover, the rounded recesses 32, 34 in the arrangement produce a far lower stress concentration in critical areas due to their smooth geometry. This is particularly useful in the case of pressure vessels having a thin wall, in which conventional positioning arrangements cannot be used because they can introduce severe stress concentrations.

Figure 4:
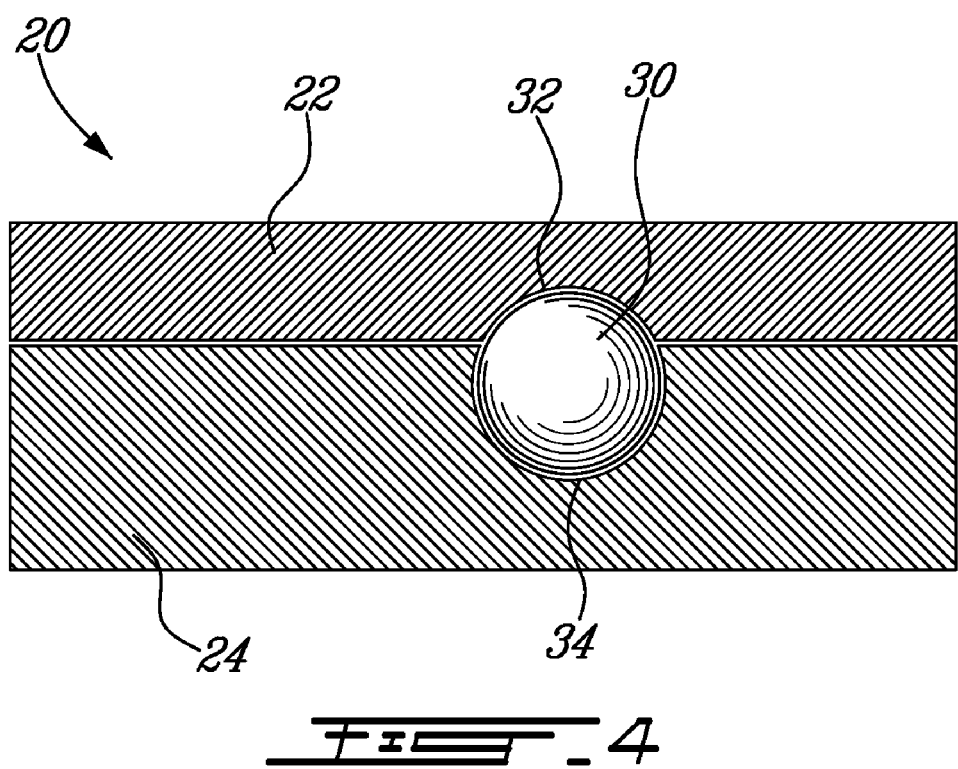
FIG. 4 is an enlarged schematic cross-section view of another example of a positioning arrangement.

If desired, the ball 30 can be partially embedded in a recess 34 provided in one of the components, which recess 34 is located deeper in the corresponding component 34 than the opposite recess 32 of the adjacent component 24. This second component 24 would have only its recess 34 shaped as a segment of the geometric form, as illustrated in FIG. 4. Both recesses 32, 34 are thus nonidentical. This is useful, for instance, if one component is thinner than the other.

Figure 3:
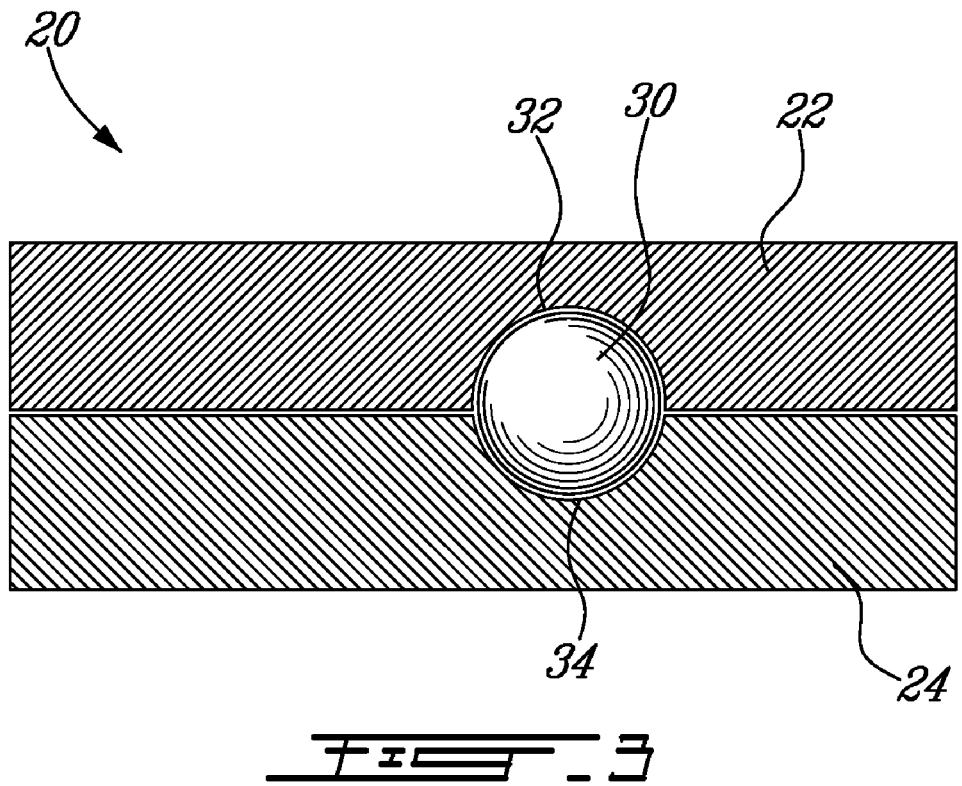
FIG. 3 is an enlarged schematic cross-section view of an example of a positioning arrangement.

It should be noted that FIGS. 3 and 4 illustrate the components 22, 24, the recesses 32, 34 and the ball 30 having a very large tolerance between them. This is only for the purpose of better illustration. In fact, the outside shape and size of the ball 30 is substantially identical to the interior shape and size of the space.

The above description is meant to be exemplary only, and one skilled in the art will recognize that changes may be made to the embodiments described without departing from the scope of what is disclosed herein. For example, the improvement is not limited to pressure vessels used in a gas turbine engine. The ball 30 and the corresponding recesses 32, 34 can have a rounded shape which is not necessarily spherical, such as ovoid, ellipsoid, spheroid, conoid, etc. Still other modifications will be apparent to those skilled in the art, in light of a review of this disclosure, and such modifications are intended to fall within the appended claims.

What is claimed is:

1. A positioning arrangement for a gas turbine engine case having a component to be secured to an inner surface of the case, the arrangement comprising:
    a gas turbine engine case assembly configured to maintain a volume of fluid inside the case assembly and configured to maintain a pressure difference across a peripheral wall of the case assembly, the wall having an inner surface;
    at least one pair of complementary spherical recesses provided in mating faces, the spherical recesses forming a rounded space when mated together, one of said spherical recesses provided on one of the mating faces on the component and the other spherical recess provided on the mating face on the inner wall of the case assembly, and
    one spherical ball matingly positioned within the rounded space of the at least one corresponding pair of complementary spherical recesses when the component is mounted to the case assembly.

2. The positioning arrangement as defined in claim 1, wherein the rounded space is spherical.

3. The positioning arrangement as defined in claim 1, wherein one of the components is a portion of a fuel nozzle.

4. The positioning arrangement as defined in claim 1, wherein the spherical recesses of a same pair are identical.

5. The positioning arrangement as defined in claim 1, wherein the spherical recesses of a same pair are nonidentical.

6. A method of assembling a component to a gas turbine engine case assembly, the method comprising:
    providing a gas turbine engine case assembly and at least one component to be mounted thereto;
    providing a first recess in one of the case assembly and the at least one component;
    providing a second recess in the other of the case assembly and at least one component, the two recesses being complementary and forming a rounded space when the two adjacent components are being assembled;
    placing a ball in a first one of the two complementary recesses, the ball having an external shape and size which substantially mate with an internal shape and size of the rounded space; and
    immovably mounting the component to the case by placing a second one of the two complementary recesses over the ball.

7. The method as defined in claim 6, wherein the rounded space is spherical.

8. The method as defined in claim 6, wherein the at least one component is a fuel nozzle.

9. The method as defined in claim 6, wherein the spherical recesses of a same pair are identical.

10. The method as defined in claim 6, wherein the spherical recesses of a same pair are nonidentical.

11. A positioning arrangement between a gas turbine engine case wall and a component to be secured to an inner surface of the gas turbine engine case wall, the positioning arrangement comprising:
    a first mating face provided on the inner surface of the gas turbine engine case;
    a second mating face provided on the component;
    at least one pair of complementary spherical recesses provided on the mating faces, the spherical recesses forming a rounded space when mated together, one of said spherical recesses of each pair provided on the second mating face and the other spherical recess of each pair provided on the first mating face, and
    one spherical ball matingly positioned within the rounded space of each corresponding pair of complementary spherical recesses when the component is secured to the gas turbine engine case wall.

12. The positioning arrangement as defined in claim 11, wherein the rounded space is spherical.

13. The positioning arrangement as defined in claim 11, wherein the component is a portion of a fuel nozzle.

14. The positioning arrangement as defined in claim 11, wherein the spherical recesses of a same pair are identical.

15. The positioning arrangement as defined in claim 11, wherein the spherical recesses of a same pair are nonidentical.

\* \* \* \* \*